US011565799B2

(12) United States Patent
Carr et al.

(10) Patent No.: US 11,565,799 B2
(45) Date of Patent: Jan. 31, 2023

(54) ADJUSTABLE DUCTED ROTOR BLADE TIP EXTENSION

(71) Applicant: Bell Textron Inc., Fort Worth, TX (US)

(72) Inventors: Timothy Brian Carr, Fort Worth, TX (US); George Matthew Thompson, Lewisville, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 236 days.

(21) Appl. No.: 16/900,543

(22) Filed: Jun. 12, 2020

(65) Prior Publication Data

US 2021/0387722 A1    Dec. 16, 2021

(51) Int. Cl.
*B64C 27/46* (2006.01)
*F01D 5/14* (2006.01)

(52) U.S. Cl.
CPC .............. *B64C 27/463* (2013.01); *F01D 5/14* (2013.01); *F05D 2220/90* (2013.01); *F05D 2240/307* (2013.01)

(58) Field of Classification Search
None
See application file for complete search history.

(56) References Cited

U.S. PATENT DOCUMENTS

| 3,117,716 | A | 1/1964 | Wernicke |
| 3,127,093 | A | 3/1964 | Sudrow |
| 3,680,977 | A | 8/1972 | Rabouyt et al. |
| 4,531,362 | A | 7/1985 | Barry et al. |
| 5,462,408 | A | 10/1995 | Coffy |
| 5,752,802 | A | 5/1998 | Jones |
| 6,206,642 | B1 | 3/2001 | Matheny et al. |
| 6,464,166 | B1 | 10/2002 | Yoeli |
| 6,561,456 | B1 | 5/2003 | Devine |
| 7,549,841 | B1 | 6/2009 | Marussich |
| 7,850,116 | B2 | 12/2010 | Stuhr |
| 8,777,572 | B2 | 7/2014 | Cheong et al. |
| 8,899,938 | B2 | 12/2014 | Enthammer |
| 2007/0231128 | A1 | 10/2007 | Callas |

(Continued)

FOREIGN PATENT DOCUMENTS

| EP | 2112330 A2 | 10/2009 |
| EP | 2607628 A2 | 6/2013 |

(Continued)

OTHER PUBLICATIONS

EPO Examination Report issued in EP Patent Application No. 19156604.1 dated Aug. 13, 2019, 5 pages.

(Continued)

*Primary Examiner* — Juan G Flores
(74) *Attorney, Agent, or Firm* — Akona IP PC

(57) ABSTRACT

A rotor system includes a rotor duct; at least one rotor blade that includes an outboard end; a tip extension mechanism affixed at the outboard end of the at least one rotor blade, the tip extension mechanism including at least one shim, the at least one rotor blade with the tip extension mechanism affixed thereto including an extended rotor blade; and a blade tip affixed to an outboard end of the extended rotor blade, wherein the blade tip is affixed to the extended rotor blade via at least one removable fastener.

19 Claims, 11 Drawing Sheets

(56) References Cited

U.S. PATENT DOCUMENTS

| | | | |
|---|---|---|---|
| 2011/0164962 A1 | 7/2011 | Wilson, Jr. et al. | |
| 2012/0195767 A1 | 8/2012 | Gervais et al. | |
| 2014/0064937 A1 | 3/2014 | Kray et al. | |
| 2014/0255201 A1 | 9/2014 | Sutton et al. | |
| 2016/0177745 A1 | 6/2016 | Uskert et al. | |
| 2016/0207623 A1 | 7/2016 | Carson | |
| 2020/0115036 A1* | 4/2020 | Vaughn | B29C 39/10 |

FOREIGN PATENT DOCUMENTS

| | | | |
|---|---|---|---|
| JP | 2001097288 A | | 4/2001 |
| WO | 199001002 | | 2/1990 |
| WO | 2014003968 A1 | | 1/2014 |
| WO | 2014096839 A1 | | 6/2014 |

OTHER PUBLICATIONS

EPO Examination Report issued in EP Patent Application No. 19156604.1 dated Jan. 3, 2020, 4 pages.
EPO Examination Report issued in EP Patent Application No. 19156604.1 dated Mar. 16, 2020, 4 pages.
EPO Search Report issued in EP Patent Application No. 19156604.1 dated Jul. 17, 2019, 4 pages.
J-PLATPAT, Patent & Utility Model No. Search, JP 2001-097288A Drawings, retrieved and printed Aug. 8, 2018, 12 pages.
USPTO Non-Final Office Action for U.S. Appl. No. 16/159,178 dated Mar. 18, 2021.
USPTO Non-Final Office Action for U.S. Appl. No. 16/159,208 dated Mar. 18, 2021.
EPO Examination Report issued in EP Patent Application No. 19156604.1 dated Jan. 18, 2021, 5 pages.
EPO Examination Report issued in EP Patent Application No. 19156604.1 dated Aug. 20, 2020, 4 pages.
EPO Examination Report issued in EP Patent Application No. 19156604.1 dated Jun. 4, 2021, 6 pages.
EPO Examination Report issued in EP Patent Application No. 19156604.1 dated Oct. 18, 2021, 4 pages.

* cited by examiner

ADJUSTABLE DUCTED ROTOR BLADE TIP EXTENSION

TECHNICAL FIELD

This disclosure relates in general to the field of aircraft and, more particularly, though not exclusively, to an adjustable ducted rotor blade tip extension for such aircraft.

BACKGROUND

There are numerous considerations involved in the design of aircraft, such as rotorcraft, including size, weight, power efficiency, fuel efficiency, noise, vibration, structural loads, and so forth. In many cases, however, it may be challenging to improve certain aspects of an aircraft without disrupting other aspects. For example, rotor blade design for aircraft rotor systems, such as ducted rotor systems, can implicate numerous performance considerations and is often an extremely challenging aspect of aircraft design.

SUMMARY

One embodiment is a rotor system including a rotor duct; at least one rotor blade, wherein the at least one rotor blade comprises an outboard end; a tip extension mechanism affixed at the outboard end of the at least one rotor blade, wherein the tip extension mechanism comprises at least one shim, the at least one rotor blade with the tip extension mechanism affixed thereto comprising an extended rotor blade; and a blade tip affixed to an outboard end of the extended rotor blade, wherein the blade tip is affixed to the extended rotor blade via at least one removable fastener.

Another embodiment is an aircraft including a fuselage; and at least one rotor system, the at least one rotor system including a rotor duct; at least one rotor blade, wherein the at least one rotor blade comprises an outboard end; a tip extension mechanism affixed at the outboard end of the at least one rotor blade, wherein the tip extension mechanism comprises at least one shim, the at least one rotor blade with the tip extension mechanism affixed thereto comprising an extended rotor blade; and a blade tip affixed to an outboard end of the extended rotor blade, wherein the blade tip is affixed to the extended rotor blade via at least one removable fastener.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
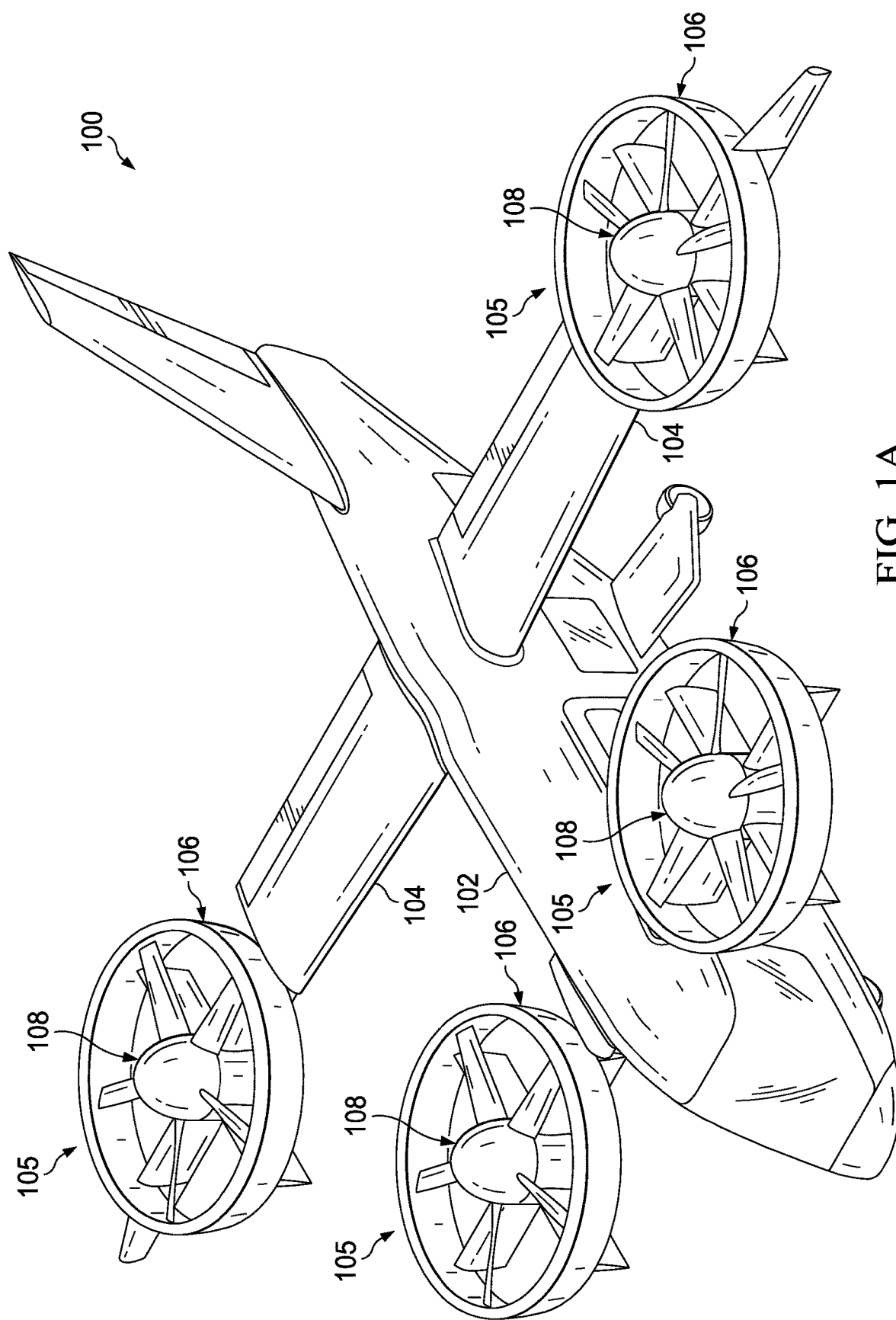
FIGS. 1A-1B illustrate a tilting ducted rotor aircraft in connection with which an adjustable ducted rotor blade tip extension in accordance with embodiments described herein may be implemented.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that is farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is an adjustable ducted rotor blade tip extension for use in connection with a ducted aircraft, such as a ducted rotorcraft. The length of the rotor blades in most ducted rotorcraft is a particularly important, due to the need to have the rotor blade tip as close as possible to, but not in contact with, the inner wall of the duct. Specifically, while minimizing the gap will maximize performance of the ducted rotor, some gap is required to ensure that there is no contact between the blade and the duct. In accordance with features of embodiments described herein, an adjustable ducted rotor blade tip extension includes shims that may be added to or removed from the blade in order to easily lengthen or shorten the blade, thereby to achieve the desired gap size.

In one embodiment, while the blade is installed in the ducted rotor, the maximum gap is measured around the circumference around the duct. Next, the blade is removed, the appropriate number of shims are removed or added, and the blade is re-installed in the ducted rotor.

In another embodiment, screws are provided normal to the blade chord, such that shims may be added or removed without requiring removal of the blade to do so. In this embodiment, the blade tip is test fit to the blade, and pilot holes are transferred from the blade to the blade tip. Shims are added to fill the resulting gap and screws are installed to retain shims and tip.

In yet another embodiment, a shim/tip carrier is provided, which can be quickly removed via a slide-in dovetail feature, for example. Shims can be removed from or added to the carrier, after which the carrier is slid back onto the blade while the blade remains in situ. Once everything is set to the appropriate length, pins may be inserted to prevent the carrier from sliding out.

In accordance with features of certain embodiments, in all implementations, the shims may be peelable, in which case, the shims are procured to an initial thickness, which can be reduced in increments of ~0.003 inches by peeling an appropriate number of layers to achieve a desired thickness. Alternatively, the shims may include discrete sheet metal cutouts, with as many as necessary stacked together to achieve a desired thickness. Shims may be made of aluminum or steel, for example, although any number of other materials may be used without departing from the spirit or scope of embodiments described herein.

Figure 1B:
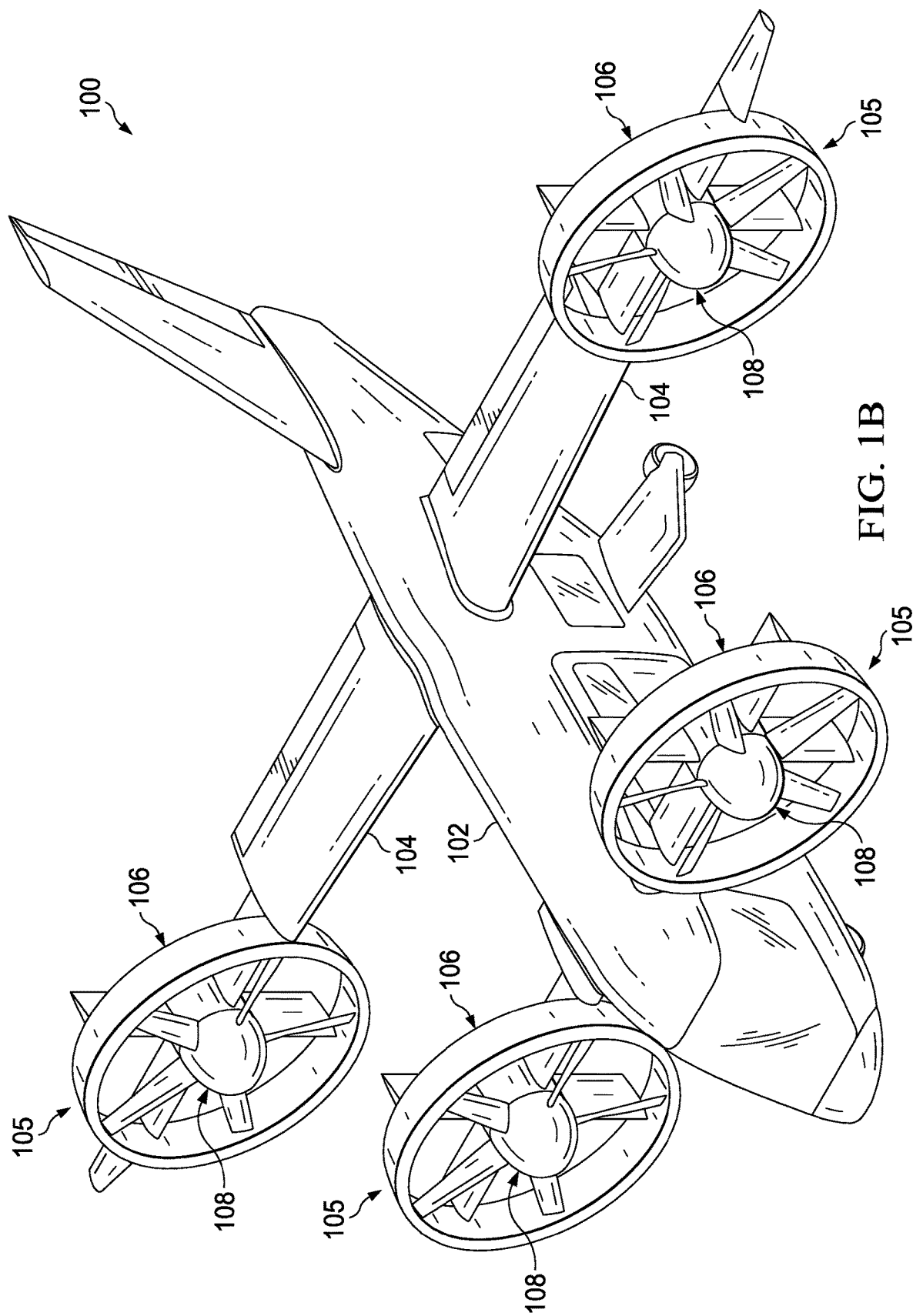
Figure 2:
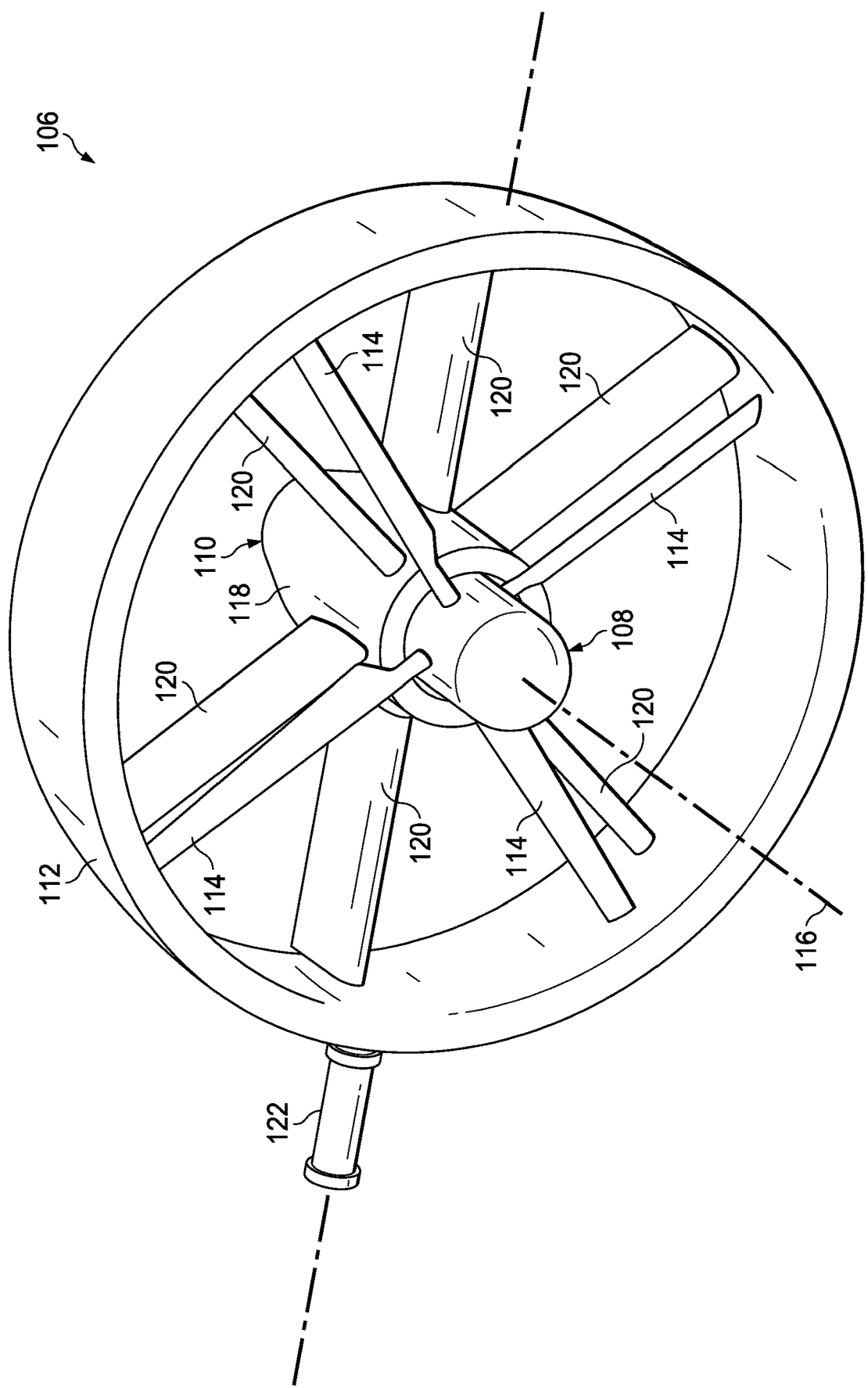
FIG. 2 illustrates a ducted rotor of the aircraft of FIGS. 1A-1B in connection with which an adjustable ducted rotor blade tip extension in accordance with embodiments described herein may be implemented.

FIGS. 1A and 1B illustrate an example tiltrotor aircraft 100 that includes ducted rotors (or fans). The tiltrotor aircraft 100 is convertible between a helicopter mode (shown in FIG. 1A), which allows for vertical takeoff and landing, hovering, and low speed directional movement, and an airplane mode (shown in FIG. 1B), which allows for forward flight as well as horizontal takeoff and landing. Aircraft 100 includes a fuselage 102, wings 104, and a plurality propulsion assemblies 105 each comprising a ducted fan 106 rotatably coupled to fuselage 102 or wings 104. As best shown in FIG. 2, each ducted fan 106 includes a rotor assembly 108, a flow-straightening stator assembly 110, and a duct 112 surrounding rotor assembly 108 and stator assembly 110. Rotor assembly 108 includes a plurality of rotor blades 114 configured to rotate about a mast axis 116. Rotation of rotor blades 114 about mast axis 116 generates thrust during aircraft operation. Stator assembly 110 is positioned downstream of rotor blades 114 and includes a stator hub 118 centrally located within duct 112 and a plurality of stator vanes 120 coupled between duct 112 and stator hub 118. Stator hub 118 may house an electric motor therein configured to drive a gearbox that produces rotational energy that drives the rotation of rotor assembly 108. Additionally and/or alternatively, stator hub 118 may house a gearbox therein that drives the rotation of rotor assembly 108, wherein the gearbox receives rotational energy from a driveshaft passing through an attachment post 122 and the adjacent stator vane 120.

Rotor blade assemblies 108 can be collectively manipulated to selectively control direction, thrust, and lift of tilting ducted fan aircraft 100. Indeed, the collective pitch of rotor blade assemblies 108 may be independently controlled from one another to allow for differential thrust output by ducted fans 106. For example, the collective pitch of the rotor blade assembly of one ducted fan may be higher or lower than the collective pitch of rotor blade assembly of another ducted fan such that the thrust generated by each ducted fan differs from each of the others.

Ducted fans 106 are each convertible, relative to fuselage 102, between a first position, as shown in FIG. 1A, and a second position, as shown in FIG. 1B. Ducted fans 106 are in the first position during vertical takeoff and landing mode. Vertical takeoff and landing mode may be considered to include hover operations of tilting ducted fan aircraft 100. Ducted fans 106 are in the second position during forward flight mode, in which tilting ducted fan aircraft 100 is in forward flight. In forward flight mode, ducted fans 106 direct their respective thrusts in the aft direction to propel tilting ducted fan aircraft 10 forward. Tilting ducted fan aircraft 100 is operable to fly in all directions during the vertical takeoff and landing mode configuration of FIG. 1A, although faster forward flight is achievable while in the forward flight mode configuration of FIG. 1B. Each ducted fan 106 may be tiltable between the first and second positions by a linear or rotary actuator acting directly on the fan 106 or on attachment post 122, which rotates the fan 106 and/or post 122 in response to commands to originating from a pilot and/or a flight control system.

Figure 3A:
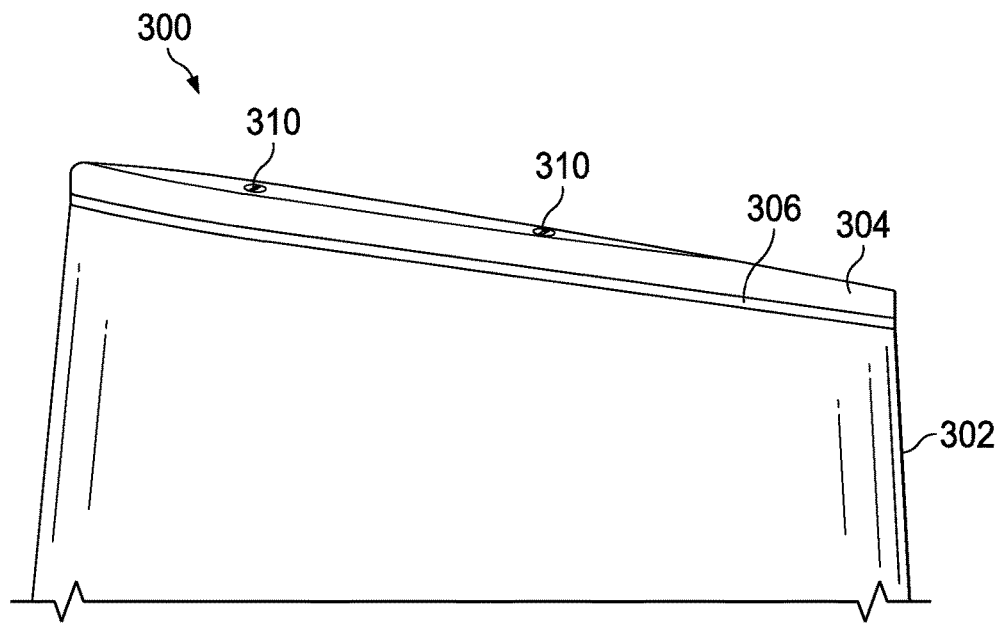
FIGS. 3A-3D illustrate various views of an embodiment of a ducted rotor blade tip extension for implementing an adjustable ducted rotor blade tip extension as described herein.
Figure 3B:
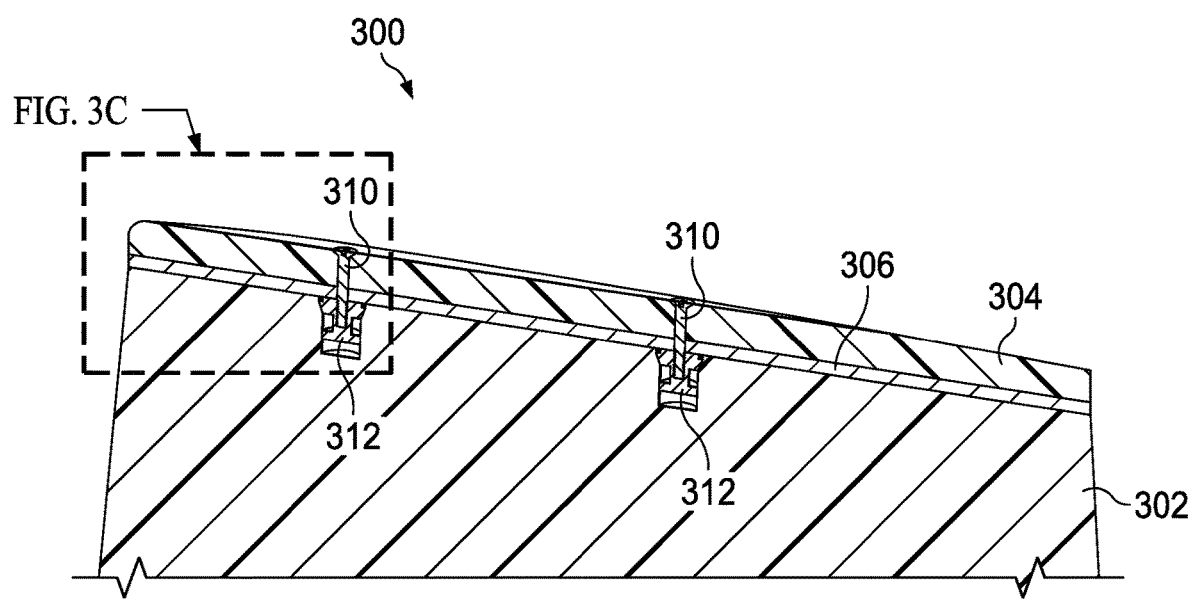
Figure 3C:
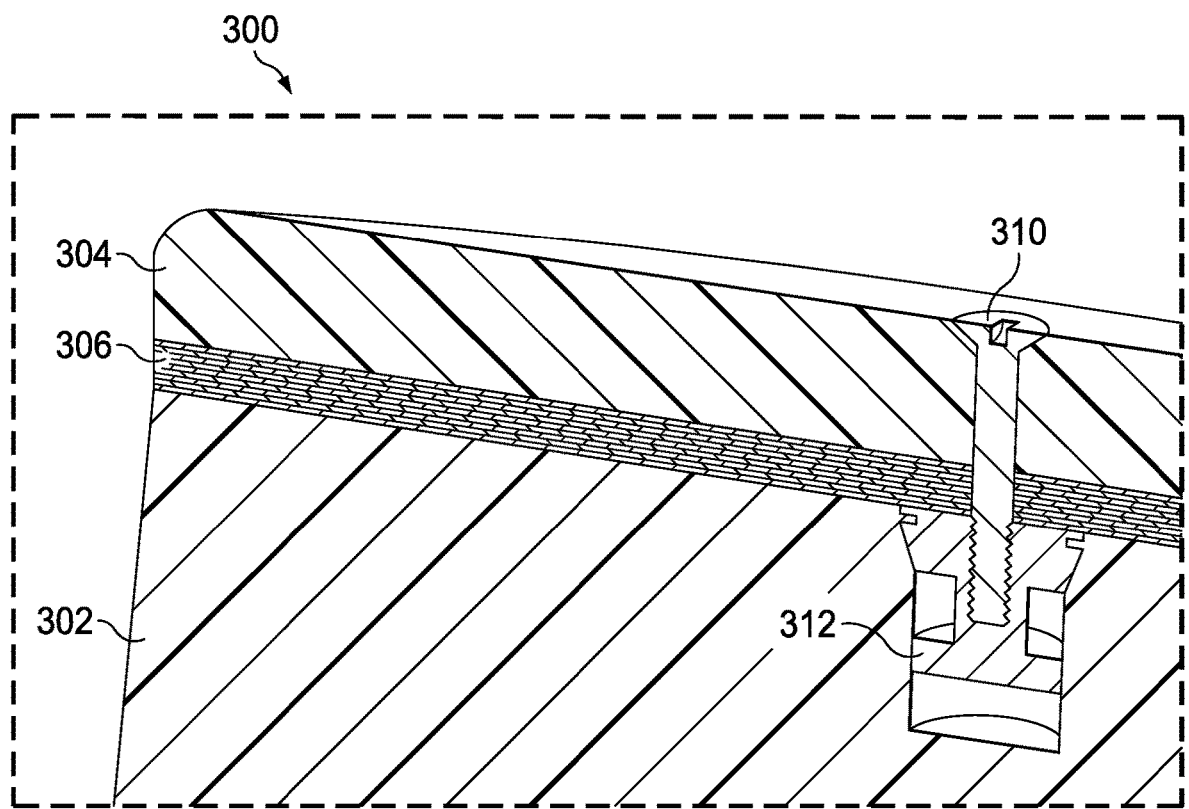
Figure 3D:
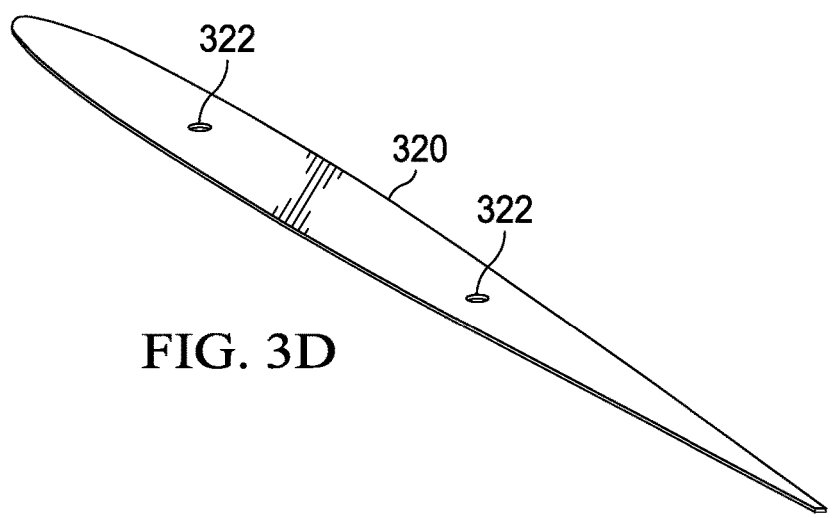

FIGS. 3A-3D illustrate various views of a first embodiment of a ducted rotor blade tip extension mechanism in accordance with features described herein. Referring to FIG. 3A, a portion of a rotor blade assembly 300 includes a rotor blade 302, a rotor blade tip 304, and an extension portion 306. As will be described in greater detail below, rotor blade extension portion 306 and rotor blade tip 304 are removably affixed to outboard end of rotor blade 302. FIG. 3B is a cross-sectional view of the portion of the rotor blade assembly 300 shown in FIG. 3A. In the embodiment shown in FIGS. 3A-3D, the extension portion 306 is sandwiched between an end of the rotor blade 302 and the rotor blade tip 304 and secured to the rotor blade 302 via one or more screws 310 disposed through the rotor blade tip 304 and the extension portion 306. As best shown in FIGS. 3B and 3C, distal ends of screws 310 are secured within threaded receptacles 312 internal to the rotor blade 302. It will be noted that, because the screws 310 are aligned in a spanwise direction of the rotor blade assembly 300, the rotor blade assembly 300 must be removed from the rotor duct to unscrew the screws 310 and remove or replace the tip 304 and/or extension portion 306. FIG. 3D illustrates a perspective view of a shim 320 comprising the extension portion 306 (FIGS. 3A-3C), illustrating example positioning of screw holes 322 for accommodating screws 310. It will be recognized that extension portion 306 includes one or more shims 320, depending a desired thickness of the extension portion.

In accordance with features of certain embodiments, the shim 320 may be peelable, in which case, the extension portion 306 may comprise a single shim 320, which is procured to an initial (maximum) thickness that can be reduced in increments of ~0.003 inches by peeling an appropriate number of layers to achieve an extension portion 306 desired thickness. Alternatively, the shim 320 may comprise a discrete sheet metal cutout, with multiple shims being stacked together to form an extension portion 306 of a desired thickness.

Figure 4A:
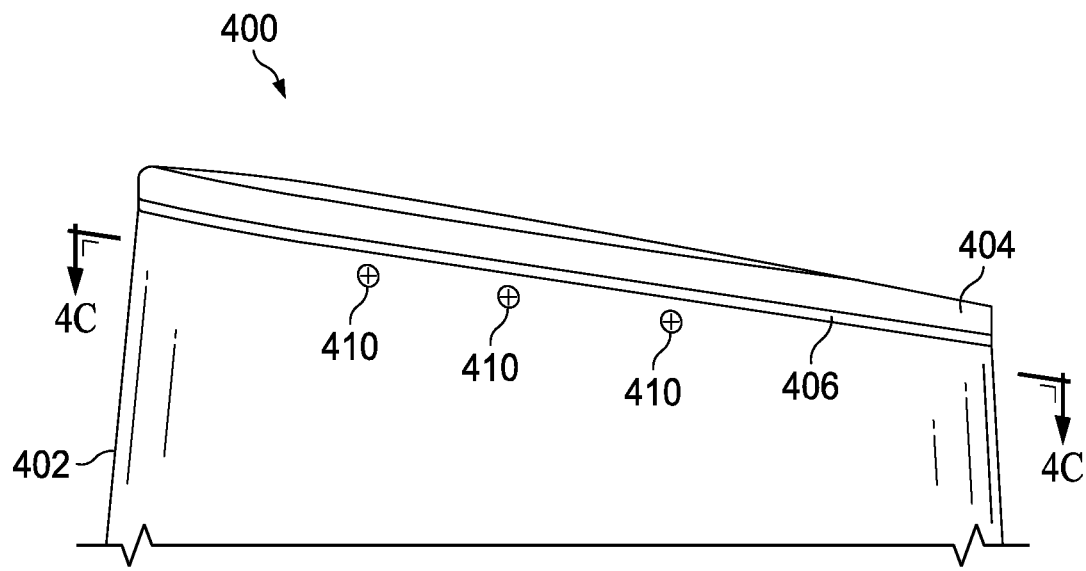
FIGS. 4A-4E illustrate various views of an alternative embodiment of a ducted rotor blade tip extension for implementing an adjustable ducted rotor blade tip extension as described herein.
Figure 4B:
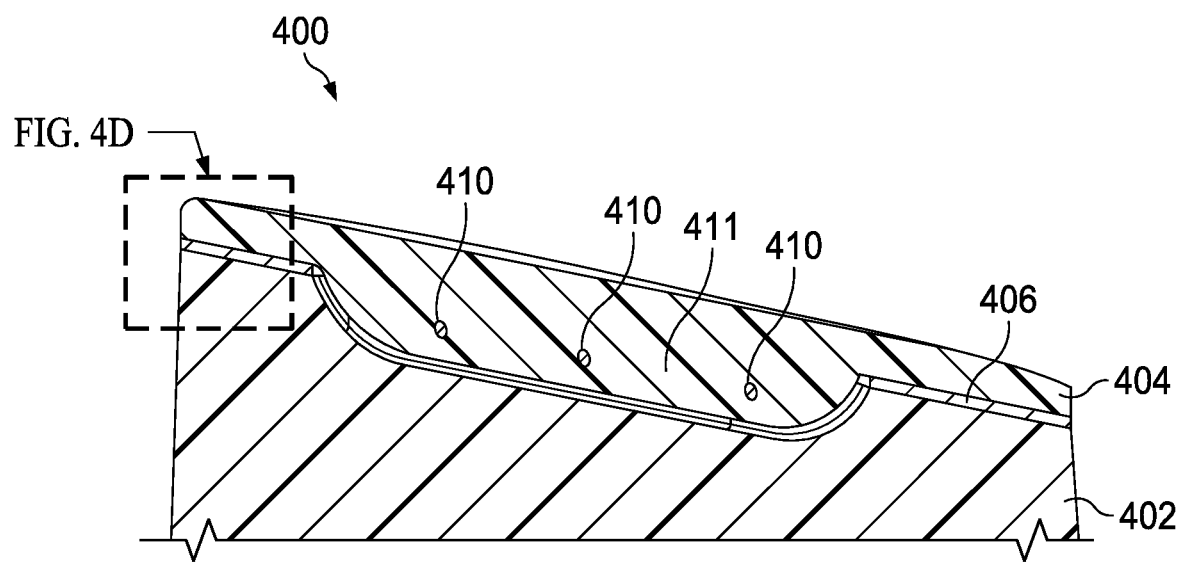
Figure 4C:
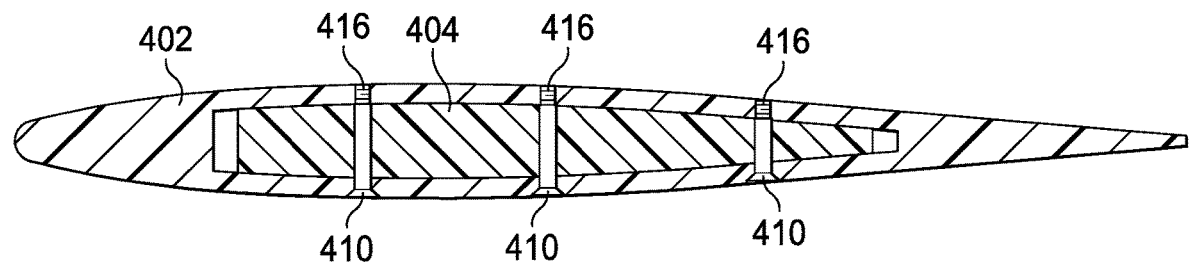
Figure 4D:
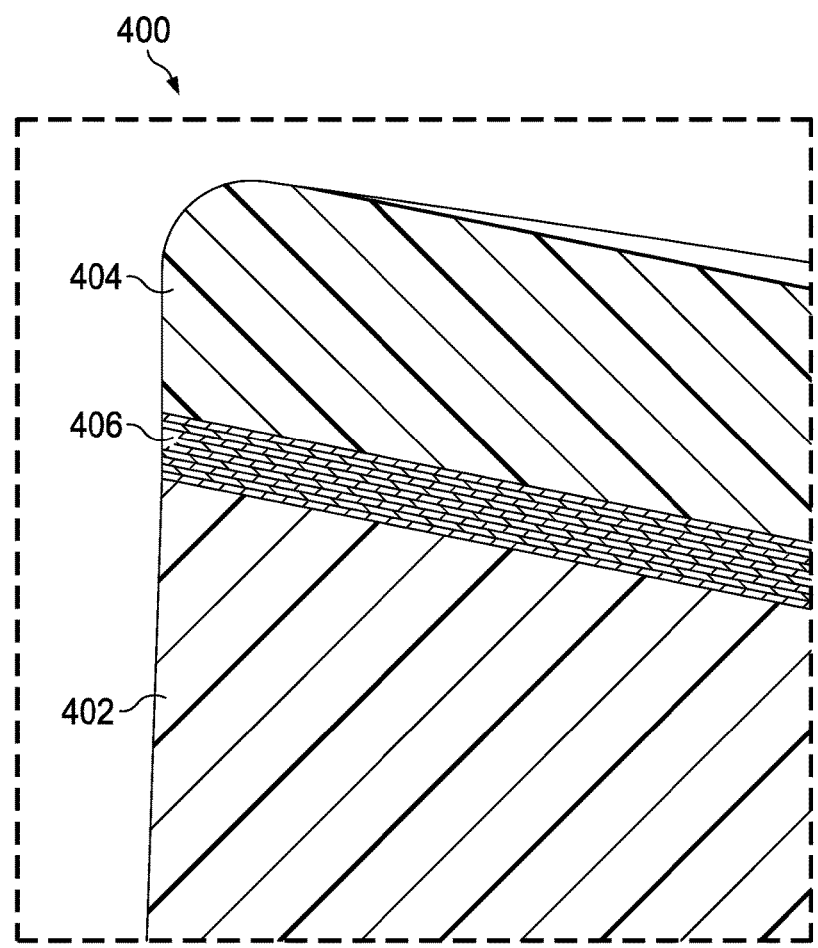

FIGS. 4A-4E illustrate various views of an alternative embodiment of a ducted rotor blade tip extension mechanism in accordance with features described herein. Referring to FIG. 4A, a portion of a rotor blade assembly 400 includes a rotor blade 402, a rotor blade tip 404, and an extension portion 406. As will be described in greater detail below, rotor blade extension portion 406 and rotor blade tip 404 are removably affixed to outboard end of rotor blade 402. FIG. 4B illustrates a cross-sectional view of the portion of the rotor blade assembly 400 shown in FIG. 4A. In the embodiment shown in FIGS. 4A-4E, the extension portion 406 is sandwiched between the rotor blade 402 and the rotor blade tip 404 and secured to the rotor blade 402 via one or more screws 410 disposed through the rotor blade 402 and a tab 412 on the rotor blade tip 404 that extends through a slot in the extension portion 406 and into a slot 414 (FIG. 4C) in the rotor blade 402. Ends of screws are received and retained in threaded receptacles 416, which may be similar to receptacles 312 (FIGS. 3B and 3C).

Figure 4E:
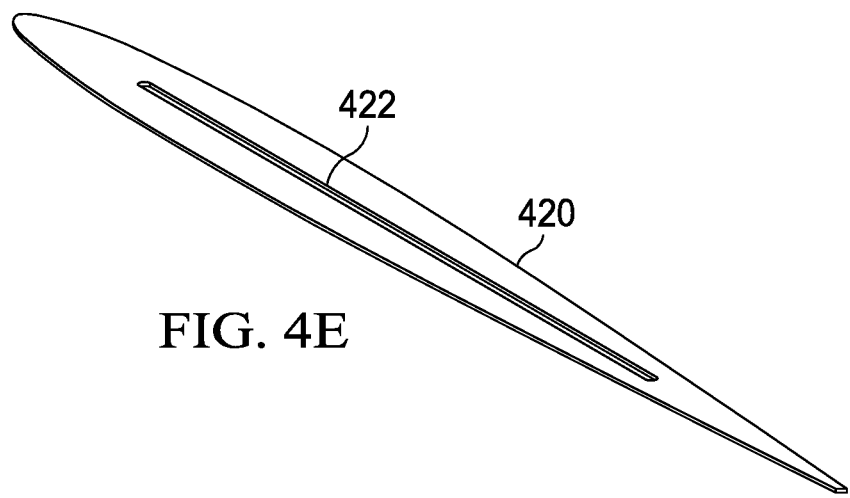

It will be noted that, because the screws 410 are oriented normal to the spanwise direction of the rotor blade assembly 400, the rotor blade assembly 400 remains in situ and need not be removed from the duct to remove or replace the tip 404 and/or extension portion 406 by loosening and/or tightening the screws 410. FIG. 4E illustrates a perspective view of a shim 420 comprising the extension portion 406 (FIGS. 4A, 4B, 4D), illustrating example positioning of a slot 422 for accommodating the tab 411. It will be recognized that extension portion 406 includes one or more shims 420, depending a desired thickness of the extension portion.

In accordance with features of certain embodiments, the shim 420 may be peelable, in which case, the extension portion 406 may comprise a single shim 420, which is procured to an initial (maximum) thickness that can be reduced in increments of ~0.003 inches by peeling an appropriate number of layers to achieve an extension portion 406 desired thickness. Alternatively, the shim 420 may comprise a discrete sheet metal cutout, with multiple shims being stacked together to form an extension portion 406 of a desired thickness.

Figure 5A:
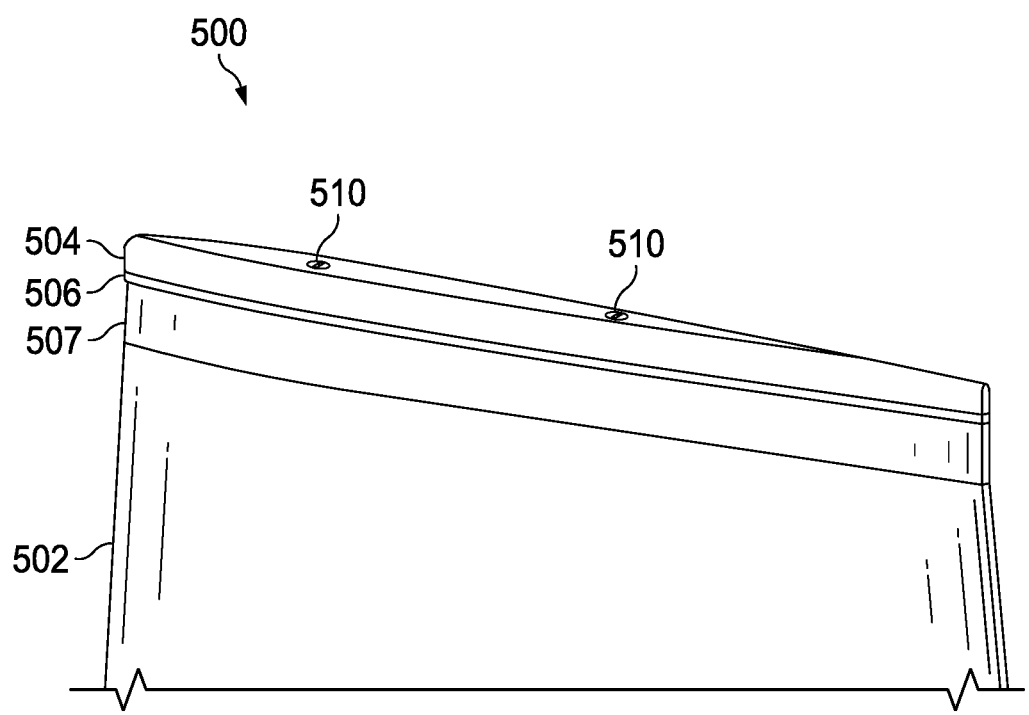
FIGS. 5A-5F illustrate various views of yet another alternative embodiment of a ducted rotor blade tip extension for implementing an adjustable ducted rotor blade tip extension as described herein.
Figure 5B:
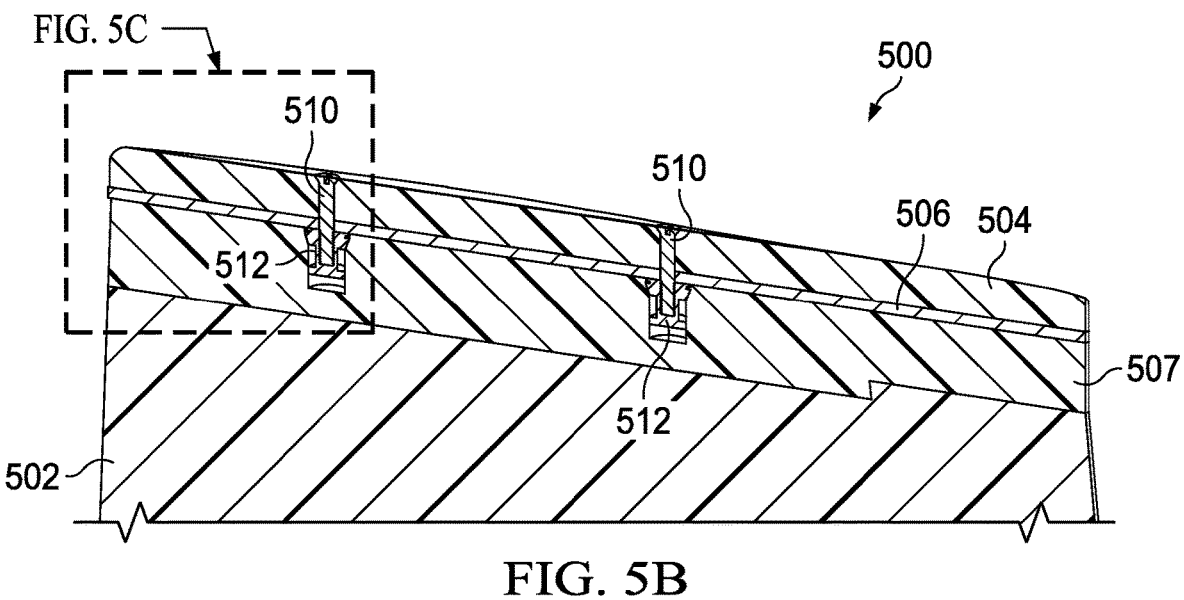
Figure 5C:
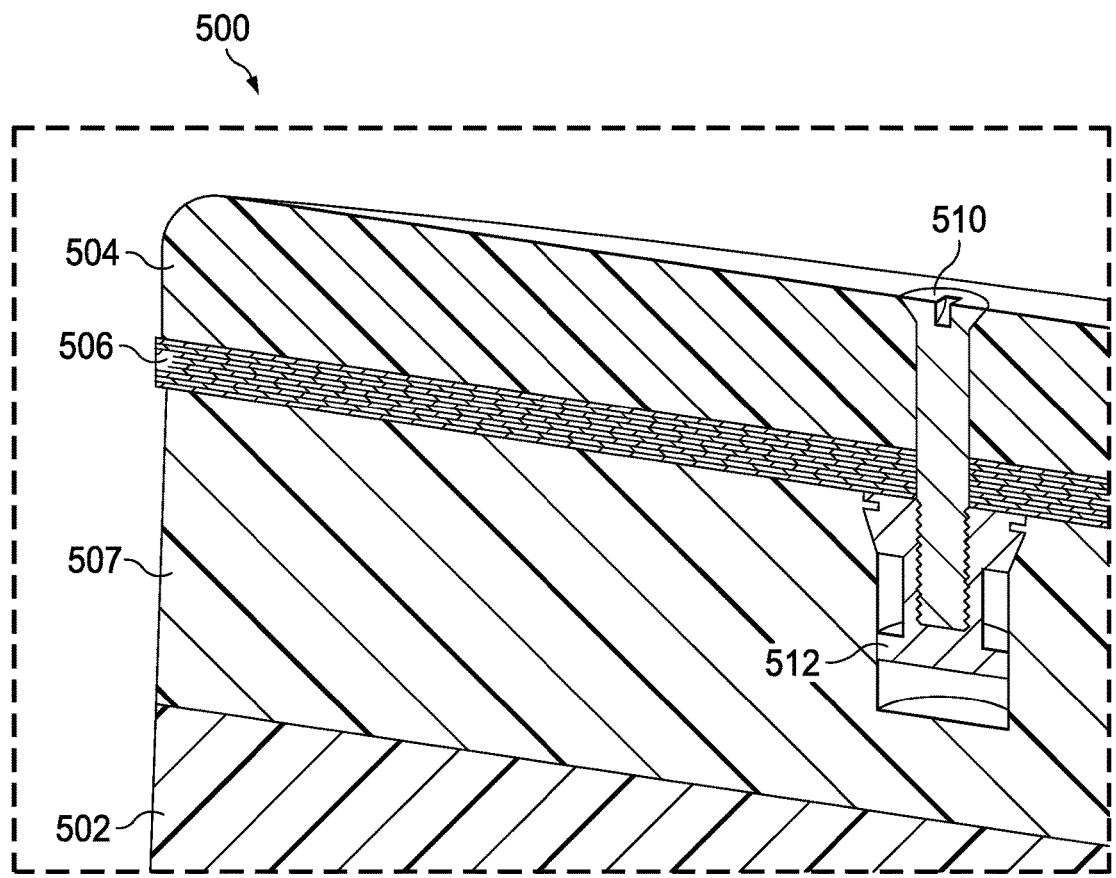

FIGS. 5A-5F illustrate various views of yet another alternative embodiment of a ducted rotor blade tip extension mechanism in accordance with features described herein. Referring to FIG. 5A, a rotor blade assembly 500 includes a rotor blade 502, a rotor blade tip 504, an extension portion 506, and a carrier 507. As will be described in greater detail below, rotor blade carrier 507 carrying extension portion 506 and rotor blade tip 504 are removably affixed to outboard end of rotor blade 502. FIG. 5B illustrates a cross-sectional view of the portion of the rotor blade assembly 500 shown in FIG. 5A. In the embodiment shown in FIGS. 5A-5F, the extension portion 506 is designed to be sandwiched between the end of the carrier 508 and the rotor blade tip 504 via one or more screws 510 disposed through the rotor blade tip 504 and the extension portion 506 and secured within threaded receptacles 512 disposed internal to the carrier 508.

Figure 5D:
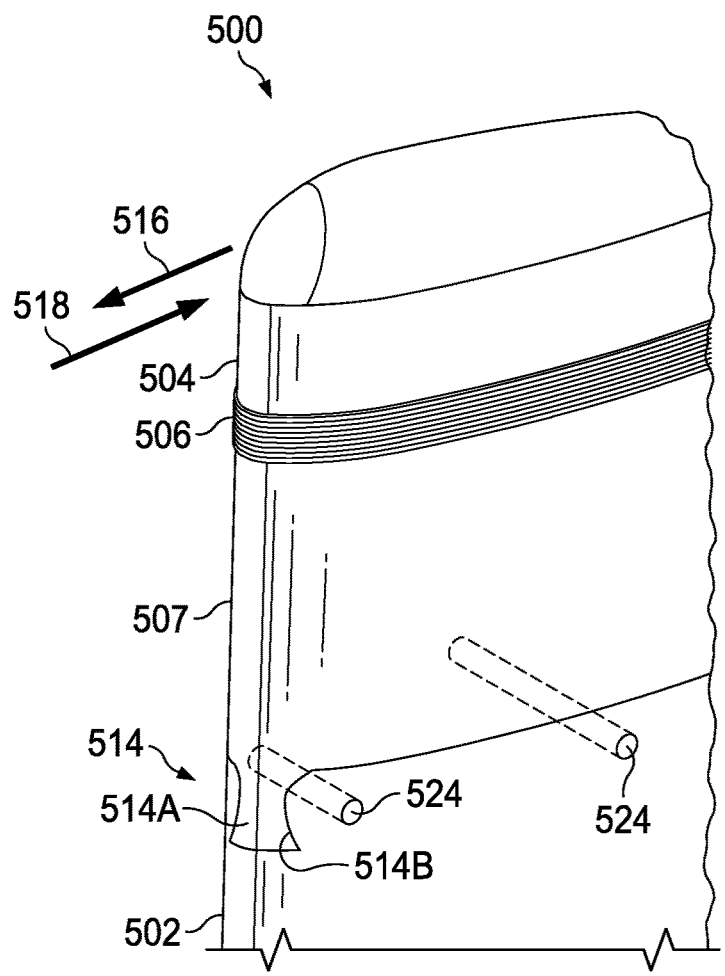
Figure 5F:
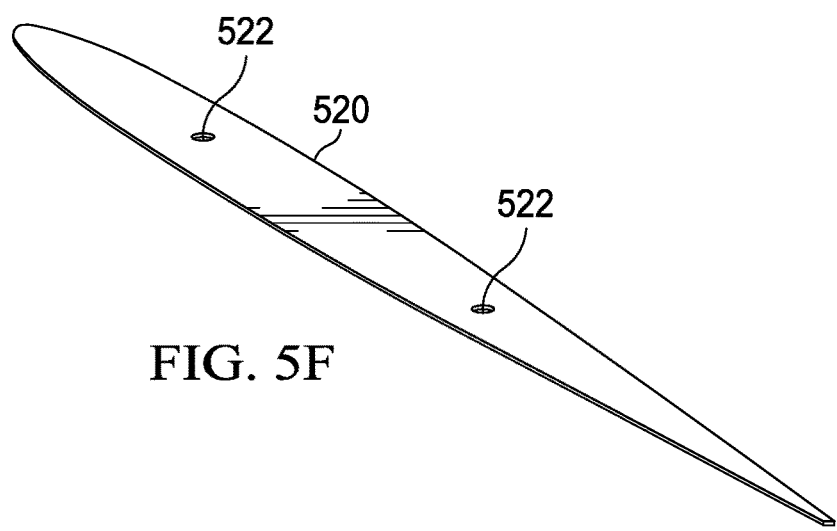
Figure 5E:
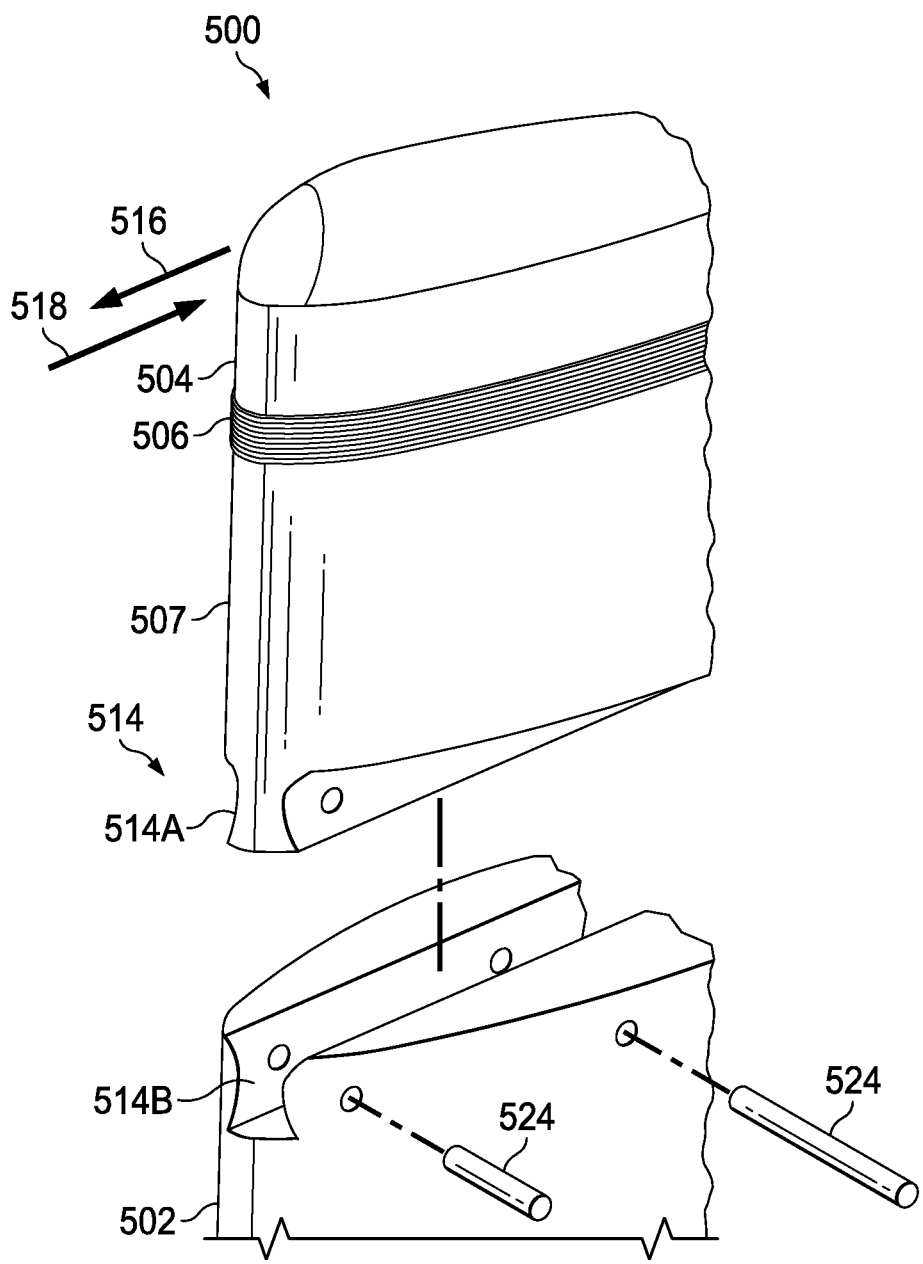

In accordance with features of embodiments described herein, as shown in FIGS. 5D and 5E, the carrier 507 is connected to the end of the rotor blade 502 via a dovetail slide mechanism 514 comprising a tail portion 514A disposed on the end of one of the carrier 507 and the rotor blade 502 and a corresponding slot portion 514B disposed on the end of the other one of the carrier 507 and the rotor blade 502. In the illustrated embodiment, the tail portion 514A is disposed on the carrier 507 and the slot portion 514B is disposed on the end of the rotor blade 502. As a result, the carrier 507, including the extension portion 506 and blade tip 504, can be removed from the rotor blade by sliding it toward the leading edge of the rotor blade, as indicated by an arrow 516. It will be noted that the rotor blade assembly 500 could also be configured such that the carrier 507 is removed from the rotor blade by sliding it toward the trailing edge of the rotor blade (i.e., in the direction indicated by an arrow 518).

FIG. 5F illustrates a perspective view of a shim 520 comprising the extension portion 506 (FIGS. 5A-5E), illustrating example positioning of holes 522 for accommodating the screws 510. It will be recognized that extension portion 506 includes one or more shims 520, depending a desired thickness of the extension portion.

In accordance with features of certain embodiments, the shim 520 may be peelable, in which case, the extension portion 506 may comprise a single shim 520, which is procured to an initial (maximum) thickness that can be reduced in increments of ~0.003 inches by peeling an appropriate number of layers to achieve an extension portion 506 desired thickness. Alternatively, the shim 520 may comprise a discrete sheet metal cutout, with multiple shims being stacked together to form an extension portion 506 of a desired thickness.

In accordance with features of embodiments shown in FIGS. 5A-5E, the carrier 507, including extension portion 506 and blade tip 504 connected thereto, may be removed without removing the rotor blade 302 from the ducted rotor by sliding the carrier 507 toward the leading edge of the rotor blade 302. At this point, the thickness of extension portion 506 may be adjusted, e.g., by unscrewing the rotor tip 504 from the carrier 507 and adding or removing shims or peeling layers of the shim, and subsequently reattaching the rotor tip 504 and the extension portion 506 to the carrier 507. Referring to FIG. 5D, the carrier 507 may be reattached to the rotor blade 502 by aligning the tail portion 514A with the slot portion 514B and sliding the carrier 507 in a direction indicated by arrow 518. It will be noted that the rotor blade assembly 500 could also be configured such that the carrier 507 is reattached to the rotor blade by sliding it toward the leading edge of the rotor blade (i.e., in the direction indicated by arrow 516). Once the carrier assembly 507 is in place, a retention mechanism, represented in FIG. 5D by pins 524, may be used to prevent the carrier 507 from sliding out; that is, to prevent tail portion 514A from sliding out of slot 514B. Although retention mechanism is represented in FIG. 5D as a pair of pins 524, it will be recognized that more or fewer than two pins may be deployed to implement retention mechanism. It will be further recognized that retention mechanism may be implemented in other manners, such as one or more clips, latches, or retention rings, for example. All of the foregoing may be performed with the blade remaining in situ.

It should be appreciated that aircraft illustrated herein, such as ducted rotor aircraft 100, are merely illustrative of a variety of aircraft that can implement the embodiments disclosed herein. Indeed, the various embodiments described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein can be integrated into a variety of aircraft configurations. It should be appreciated that even though aircraft are particularly well-suited to implement the embodiments of the present disclosure, non-aircraft vehicles and devices can also implement the embodiments.

The components of rotor assembly 108 may comprise any materials suitable for use with an aircraft rotor and may include any number of rotor blades.

Example 1 is a rotor system including a rotor duct; at least one rotor blade, wherein the at least one rotor blade comprises an outboard end; a tip extension mechanism affixed at the outboard end of the at least one rotor blade, wherein the tip extension mechanism comprises at least one shim, the at least one rotor blade with the tip extension mechanism affixed thereto comprising an extended rotor blade; and a blade tip affixed to an outboard end of the extended rotor blade, wherein the blade tip is affixed to the extended rotor blade via at least one removable fastener.

In Example 2, the rotor system of Example 1 may further include the at least one shim including one or more peelable layers such that a thickness thereof is reduceable by peeling away one or more of the peelable layers.

In Example 3, the rotor system of Example 1 or 2 may further include the tip extension mechanism and the blade tip being affixed to the rotor blade with at least one mechanical fastener.

In Example 4, the rotor system of any of Examples 1-3 may further include the at least one mechanical fastener being oriented normal to a spanwise direction of the rotor blade.

In Example 5, the rotor system of any of Examples 1-4 may further include the at least one mechanical fastener being aligned with a spanwise direction of the rotor blade.

In Example 6, the rotor system of any of Examples 1-5 may further include the tip extension mechanism and the blade tip being secured in a carrier for affixing the tip extension mechanism and the blade tip to the outboard end of the rotor blade.

In Example 7, the rotor system of any of Examples 1-6 may further include the carrier being affixed to the outboard end of the rotor blade via a dovetail slide mechanism.

In Example 8, the rotor system of any of Examples 1-7 may further include a retention mechanism for inhibiting movement of the dovetail slide mechanism.

In Example 9, the rotor system of any of Examples 1-8 may further include the blade tip including a tab portion and the at least one shim including a corresponding slot therethrough and the outboard end of the rotor blade including a corresponding slot therein for receiving the tab portion.

In Example 10, the rotor system of any of Examples 1-9 may further include the at least one fastener extending through the rotor blade and the tab portion.

Example 11 is an aircraft including a fuselage; and at least one rotor system, the at least one rotor system including a rotor duct; at least one rotor blade, wherein the at least one rotor blade comprises an outboard end; a tip extension mechanism affixed at the outboard end of the at least one rotor blade, wherein the tip extension mechanism comprises at least one shim, the at least one rotor blade with the tip extension mechanism affixed thereto comprising an extended rotor blade; and a blade tip affixed to an outboard end of the extended rotor blade, wherein the blade tip is affixed to the extended rotor blade via at least one removable fastener.

In Example 12, the aircraft of Example 11 may further include the at least one shim including one or more peelable layers such that a thickness thereof is reduceable by peeling away one or more of the peelable layers.

In Example 13, the aircraft of Example 11 or 12 may further include the tip extension mechanism and the blade tip being affixed to the rotor blade with at least one mechanical fastener.

In Example 14, the aircraft of any of Examples 11-13 may further include the at least one mechanical fastener being oriented normal to a spanwise direction of the rotor blade.

In Example 15, the aircraft of any of Examples 11-14 may further include the at least one mechanical fastener being aligned with a spanwise direction of the rotor blade.

In Example 16, the aircraft of any of Examples 11-15 may further include the tip extension mechanism and the blade tip being secured in a carrier for affixing the tip extension mechanism and the blade tip to the outboard end of the rotor blade.

In Example 17, the aircraft of any of Examples 11-16 may further include the carrier being affixed to the outboard end of the rotor blade via a dovetail slide mechanism.

In Example 18, the aircraft of any of Examples 11-17 may further include a retention mechanism for inhibiting movement of the dovetail slide mechanism.

In Example 19, the aircraft of any of Examples 11-18 may further include the blade tip including a tab portion and the at least one shim including a corresponding slot therethrough and the outboard end of the rotor blade including a corresponding slot therein for receiving the tab portion.

In Example 20, the aircraft of any of Examples 11-19 may further include the at least one fastener extending through the rotor blade and the tab portion.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotor system comprising:
   at least one rotor blade, wherein the at least one rotor blade comprises an outboard end;
   a tip extension mechanism affixed at the outboard end of the at least one rotor blade, wherein the tip extension mechanism comprises at least one shim, the at least one rotor blade with the tip extension mechanism affixed thereto comprising an extended rotor blade; and
   a blade tip affixed to an outboard end of the extended rotor blade;
   wherein the at least one shim comprises one or more peelable layers such that a thickness thereof is reduceable by peeling away one or more of the peelable layers.

2. The rotor system of claim 1, wherein the tip extension mechanism and the blade tip are affixed to the at least one rotor blade with at least one mechanical fastener.

3. The rotor system of claim 2, wherein the at least one mechanical fastener is oriented normal to a spanwise direction of the at least one rotor blade.

4. The rotor system of claim 2, wherein the at least one mechanical fastener is aligned with a spanwise direction of the at least one rotor blade.

5. The rotor system of claim 1, wherein the tip extension mechanism and the blade tip are secured in a carrier for affixing the tip extension mechanism and the blade tip to the outboard end of the at least one rotor blade.

6. The rotor system of claim 5, wherein the carrier is affixed to the outboard end of the at least one rotor blade via a dovetail slide mechanism.

7. The rotor system of claim 6 further comprising a retention mechanism for inhibiting movement of the dovetail slide mechanism.

8. The rotor system of claim 1, wherein the blade tip comprises a tab portion and wherein the at least one shim comprises a corresponding slot therethrough and the outboard end of the at least one rotor blade comprises a corresponding slot therein for receiving the tab portion.

9. The rotor system of claim 8, wherein at least one fastener extends through the at least one rotor blade and the tab portion.

10. An aircraft comprising:
a fuselage; and
at least one rotor system, the at least one rotor system comprising:
  at least one rotor blade, wherein the at least one rotor blade comprises an outboard end;
  a tip extension mechanism affixed at the outboard end of the at least one rotor blade, wherein the tip extension mechanism comprises at least one shim, the at least one rotor blade with the tip extension mechanism affixed thereto comprising an extended rotor blade; and
  a blade tip affixed to an outboard end of the extended rotor blade;
wherein the at least one shim comprises one or more peelable layers such that a thickness thereof is reduceable by peeling away one or more of the peelable layers.

11. The aircraft of claim 10, wherein the tip extension mechanism and the blade tip are affixed to the at least one rotor blade with at least one mechanical fastener.

12. The aircraft of claim 11, wherein the at least one mechanical fastener is oriented normal to a spanwise direction of the at least one rotor blade.

13. The aircraft of claim 11, wherein the at least one mechanical fastener is aligned with a spanwise direction of the at least one rotor blade.

14. The aircraft of claim 10, wherein the tip extension mechanism and the blade tip are secured in a carrier for affixing the tip extension mechanism and the blade tip to the outboard end of the at least one rotor blade.

15. The aircraft of claim 14, wherein the carrier is affixed to the outboard end of the at least one rotor blade via a dovetail slide mechanism.

16. The aircraft of claim 15 further comprising a retention mechanism for inhibiting movement of the dovetail slide mechanism.

17. The aircraft of claim 10, wherein the blade tip comprises a tab portion and wherein the at least one shim comprises a corresponding slot therethrough and the outboard end of the at least one rotor blade comprises a corresponding slot therein for receiving the tab portion.

18. The aircraft of claim 17, wherein at least one fastener extends through the at least one rotor blade and the tab portion.

19. A rotor system comprising:
a rotor duct;
at least one rotor blade, wherein the at least one rotor blade comprises an outboard end;
a tip extension mechanism affixed at the outboard end of the at least one rotor blade, wherein the tip extension mechanism comprises at least one shim, the at least one rotor blade with the tip extension mechanism affixed thereto comprising an extended rotor blade; and
a blade tip affixed to an outboard end of the extended rotor blade, wherein the blade tip is affixed to the extended rotor blade via at least one removable fastener;
wherein the at least one shim comprises one or more peelable layers such that a thickness thereof is reduceable by peeling away one or more of the peelable layers.

* * * * *